United States Patent
Zhi et al.

(10) Patent No.: US 11,955,627 B2
(45) Date of Patent: Apr. 9, 2024

(54) Zn POWDER/Sn COATED Cu CURRENT COLLECTOR AS ANODE FOR Zn BATTERY

(71) Applicant: CITY UNIVERSITY OF HONG KONG, Kowloon (HK)

(72) Inventors: Chunyi Zhi, Kowloon (HK); Qing Li, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 115 days.

(21) Appl. No.: 17/580,192

(22) Filed: Jan. 20, 2022

(65) Prior Publication Data

US 2022/0231278 A1 Jul. 21, 2022

Related U.S. Application Data

(60) Provisional application No. 63/139,759, filed on Jan. 20, 2021.

(51) Int. Cl.
| | | |
|---|---|---|
| *H01M 4/36* | (2006.01) | |
| *H01M 4/02* | (2006.01) | |
| *H01M 4/04* | (2006.01) | |
| *H01M 4/38* | (2006.01) | |
| *H01M 4/62* | (2006.01) | |
| *H01M 4/66* | (2006.01) | |

(52) U.S. Cl.
CPC ......... *H01M 4/366* (2013.01); *H01M 4/0404* (2013.01); *H01M 4/0457* (2013.01); *H01M 4/661* (2013.01); *H01M 2004/027* (2013.01); *H01M 4/38* (2013.01); *H01M 4/623* (2013.01); *H01M 4/625* (2013.01)

(58) Field of Classification Search
CPC .............................................. H01M 2004/027
See application file for complete search history.

(56) References Cited

U.S. PATENT DOCUMENTS

| | | | | |
|---|---|---|---|---|
| 2011/0086252 A1* | 4/2011 | Phillips | ............... | H01M 50/325 29/623.2 |
| 2014/0147757 A1* | 5/2014 | Rolison | ............... | H01M 12/085 429/406 |
| 2017/0338479 A1* | 11/2017 | Parker | ................ | H01M 12/085 |
| 2018/0159094 A1* | 6/2018 | Audebert | ............ | H01M 50/105 |
| 2018/0277899 A1* | 9/2018 | Takami | ................ | H01M 4/485 |
| 2018/0366786 A1* | 12/2018 | Fujii | ...................... | H01M 4/13 |
| 2019/0006721 A1* | 1/2019 | Zhamu | ............. | H01M 10/3954 |

* cited by examiner

*Primary Examiner* — Scott J. Chmielecki
(74) *Attorney, Agent, or Firm* — Conley Rose, P.C.; Michael W. Piper; Andrew M. Metrailer

(57) ABSTRACT

A novel anode for a zinc battery is proposed, in which zinc is provided as a coat of zinc powder onto a tin substrate, which is in turn laid over a copper substrate for a current collector. Alternatively, the coat of zinc powder is laid over titanium as the current collector. Such configurations mitigate zinc corrosion and hydrogen production.

12 Claims, 17 Drawing Sheets

Zn POWDER/Sn COATED Cu CURRENT COLLECTOR AS ANODE FOR Zn BATTERY

CROSS-REFERENCE TO RELATED COUNTERPART APPLICATIONS

This application claims priority to U.S. Provisional Application No. 63/139,759 filed in the United States Patent and Trademark Office on Jan. 20, 2021 and entitled, "ZN POWDER/SN COATED CU CURRENT COLLECTOR AS ANODE FOR ZN BATTERY", the entirety of which is incorporated herein by reference in its entirety.

TECHNICAL FIELD OF THE INVENTION

The invention relates to the field of zinc batteries.

BACKGROUND

Zinc (Zn) foil is widely used as anode because Zn is stable. However, while it is possible to use Zn foil as both working electrode and current collector simultaneously in lab condition, it is problematic on a scaled up, commercial level, and often shortens the battery life. In industrial productions of Zn batteries, therefore, Zn powder is preferred over Zn foil as anode material, and it is usually coupled to a current collector which is not zinc. Such a Zn powder (Zn-P)/current collector configuration is much more practical in actual battery products, allowing better control in product performance and product manufacturing. A common current collect is copper substrate.

However, it has been found that use of copper as the current collector leads to other problems. For example, a corrosion study of the Zn-P@Cu anode shows that this configuration induces cell swelling upon cell aging and cycling. During the aging process of Zn-P@Cu electrode, 10.1 μmol cm$^{-2}$ hydrogen generates on the surface of Cu, and the Zn-P dissolves and morphology of the anode changes, such that after 120 h and Zn-P layer was deteriorated.

It is desirable therefore to mitigate these problems in Zn batteries, particular in rechargeable Zn batteries (RZBs).

Statement of Invention

In a first aspect, the invention proposes a battery electrode comprising: a zinc substrate; a copper substrate; and a tin substrate placed between the zinc substrate and the copper substrate.

Preferably, the tin substrate is applied by electroplating the piece of copper in an electrolyte solution selected from group consisting of: $SnSO_4$, $SnCl_2$, and $(CH_3SO_3)_2Sn$.

Preferably, the zinc substrate is a layer of zinc powder; or a layer of Zn electrodeposited onto the tin.

Typically, the zinc powder is provided onto the tin layer by a applying a coating slurry; the coating slurry comprising: zinc powder and a binder in a mass ratio 97:3.

Typically, the binder can be selected from the group of PVDF and PTFE.

Preferably, the coating slurry further comprises a conductive agent; the conductive agent being a suspension of carbon nanotube in N-Methyl-2-pyrrolidone (NMP); or the conductive agent is selected from the group of CNF, super P, Ketjen black, acetylene black.

Preferably, batter electrode further comprises a cathode comprising anyone of $MnO_2$, $V_2O_5$, and Prussian Analog.

In a second aspect, the invention proposes a method of providing a copper current collector coated with tin, comprising the steps of: providing a solution of: $SnCl_2 \cdot H_2O$ (10 g·L$^{-1}$), $NaH_2PO_2 \cdot 2H_2O$, $CS(NH_2)_2$ (70 g·L$^{-1}$), and hydrochloric acid (2 g·L$^{-1}$); immersing a piece of copper into the solution for 5 minutes to provide a layer of tin on the piece of copper; lifting the tin coated piece of copper from the solution; and washing the tin coated piece of copper with water.

In a third aspect, the invention proposes a battery electrode comprising: a zinc substrate; and a titanium substrate for a current collector.

BRIEF DESCRIPTION OF DRAWINGS

It will be convenient to further describe the present invention with respect to the accompanying drawings that illustrate possible arrangements of the invention, in which like integers refer to like parts. Other embodiments of the invention are possible, and consequently the particularity of the accompanying drawings is not to be understood as superseding the generality of the preceding description of the invention.

FIGS. 9a to FIG. 9l show experimental results of a prototype of the embodiment of FIG. 4.

DESCRIPTION OF EMBODIMENT(S)

Figure 1:
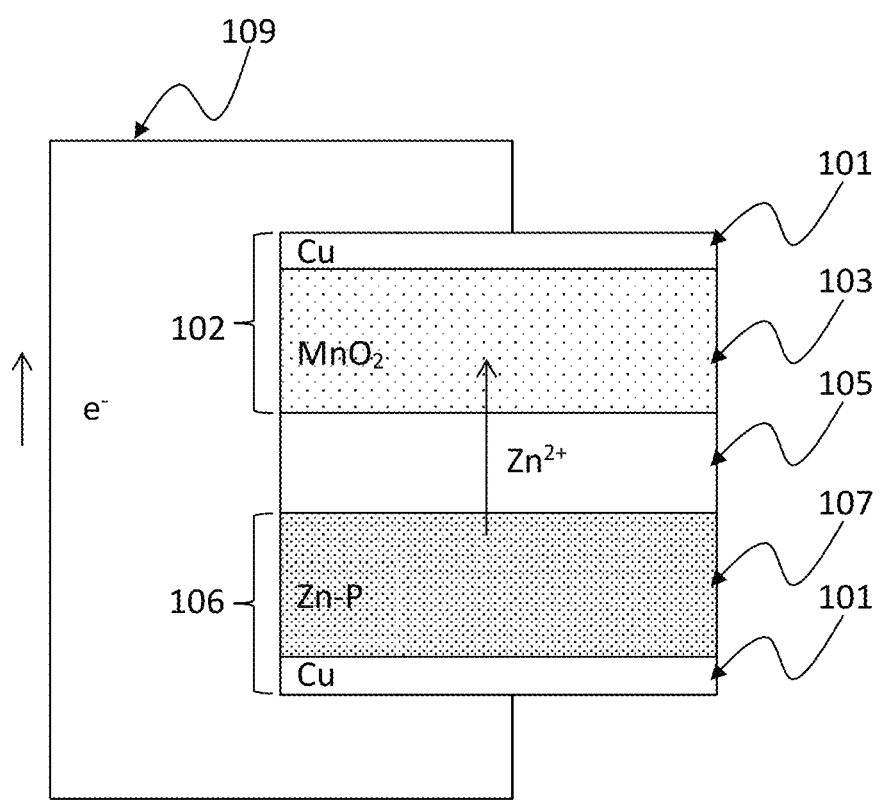
FIG. 1 illustrates a comparative prior art.

FIG. 1 is a schematic diagram of a prior art battery, which is a zinc (Zn) battery. The anode 102 for Zn battery comprises mainly Zn powder 107, denoted Zn-P in this specification, and the cathode 106 comprises manganese oxide ($MnO_2$) powder 103. The Zn powder 107 is placed next to a current collector, which is a copper plate or copper (Cu) substrate 101. Together, the Cu current collector 101 and the Zn powder 107 form the complete anode 102, and is denoted Zn-P@Cu.

Similarly, the $MnO_2$ powder 103 is placed adjacent a Cu substrate 101, this Cu substrate being for a current collector for the cathode.

A separator 105 is placed between the Zn powder of the anode 102 and the $MnO_2$ powder of the cathode 106 to prevent direct contact there between.

As the skilled man would know, electrons travel across the wire 109 from the Cu substrate of the Zn anode 102 to the Cu substrate of the $MnO_2$ cathode 106, while Zn in the anode 102 is oxidized into Zn ions to yield the electrons. The Zn ions travel across the separator 105 to the $MnO_2$ cathode 106.

It has been found that using the Cu current collector with Zn contributes to galvanic corrosion. In particular, the galvanic corrosion between the two metals consist of two reactions, one reaction being that of water decomposition and hydrogen evolution, and the other is due to Zn dissolution of the anode 102.

Figure 2:
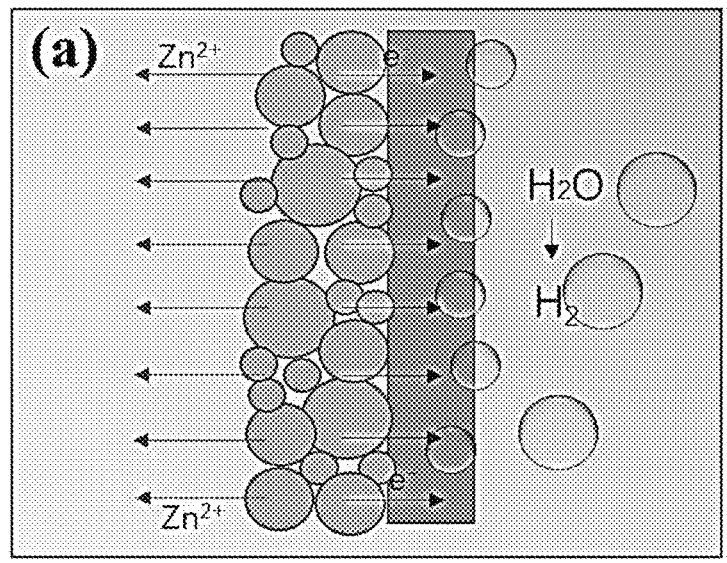
FIG. 2 illustrates the corrosion mechanisms in the comparative prior art of FIG. 1.
Figure 3:
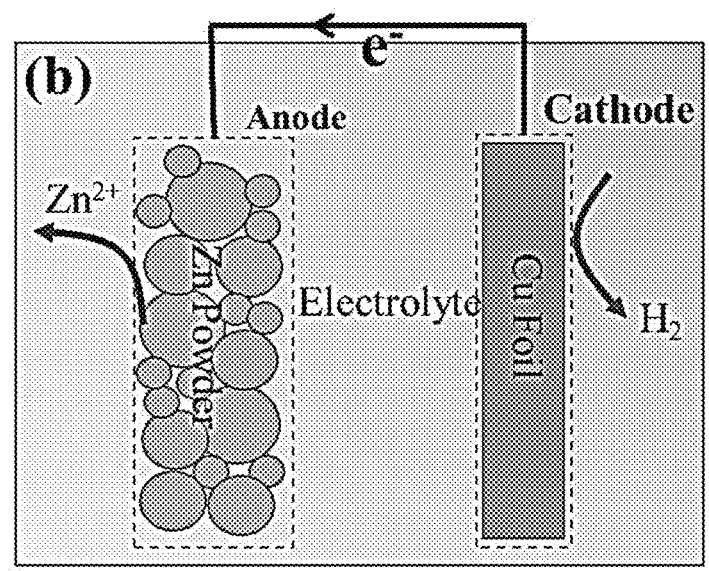
FIG. 3 illustrates the corrosion mechanisms in the comparative prior art of FIG. 1.

FIG. 2 illustrates schematically galvanic corrosion observable in the prior art. It has been to found that between a Cu substrate and Zn-P, there is production of hydrogen gas. FIG. 3 illustrates the equivalent circuit of this galvanic corrosion. The generation of hydrogen gas can deform the battery by causing the battery to bloat. More specifically, it has been found that the galvanic corrosion is due to the difference equilibrium potentials (0.42 V) between Cu current collector and Zn.

Figure 4:
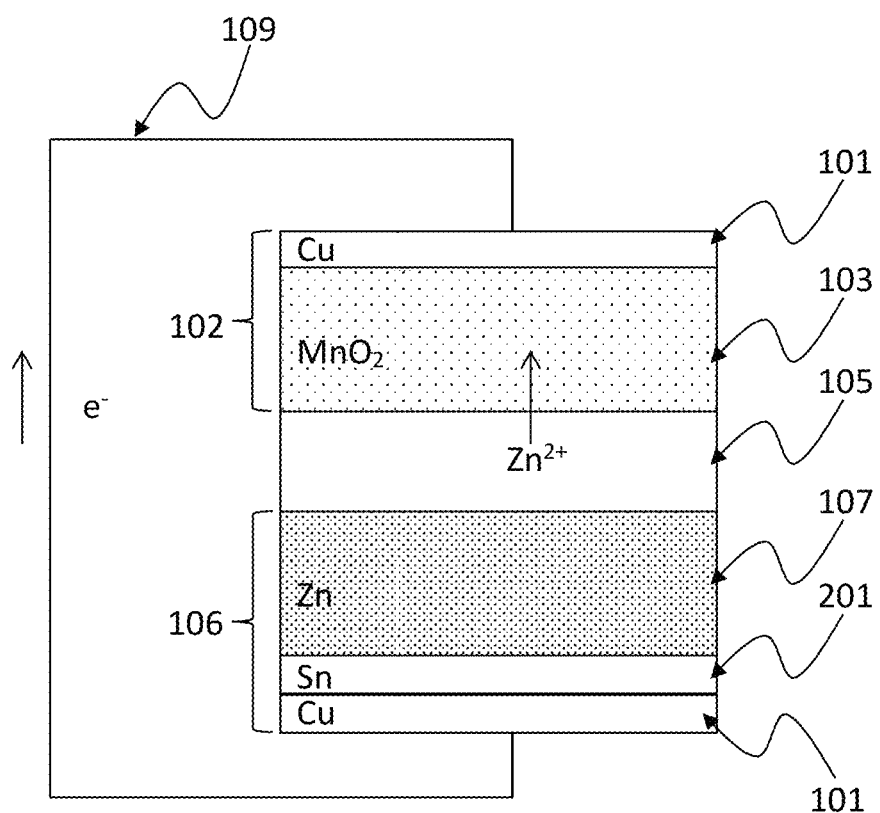
FIG. 4 illustrates an embodiment of the invention.

FIG. 4 shows a first embodiment, which is also a Zn battery. The anode 102 of the Zn battery is Zn powder 107 and the cathode 106 is $MnO_2$ powder 103. The $MnO_2$ powder 103 is placed adjacent a Cu substrate for a current collector.

At the anode, the Zn powder 107 is also placed next to a Cu substrate. However, between the Zn powder 107 and the Cu substrate is a tin (Sn) substrate. This configuration is denoted Zn-P@Sn—Cu//$MnO_2$. Therefore, the Cu substrate is separated from the Zn-P layer by the Sn substrate.

The embodiment mitigates corrosion by using Sn. Furthermore, Sn has a higher overpotential for hydrogen generation. As shown in FIG. 4, Sn is preferably plated onto the Cu surface, which can be shown to reduce hydrogen generated by about 3.5 $\mu mol \cdot cm^{-2}$ after 30 h, as compared to the prior art that does not have the layer of Sn. The hydrogen amount during cycling has been reduced to 12.5% (7.9 $\mu mol \cdot cm^{-2}$) from that of Zn-P@Cu (57 $\mu mol \cdot cm^{-2}$). In particular, with an anode:cathode mass ratio of 10:7, it has been found that there are better storage and cycling performance of 101 $mAh \cdot g^{-1}$ after 300 cycles. In contrast, prior art batteries of the configuration Zn-P@Cu//$MnO_2$ produce only 31 $mAh \cdot g^{-1}$ after 300 cycles.

Figure 5:
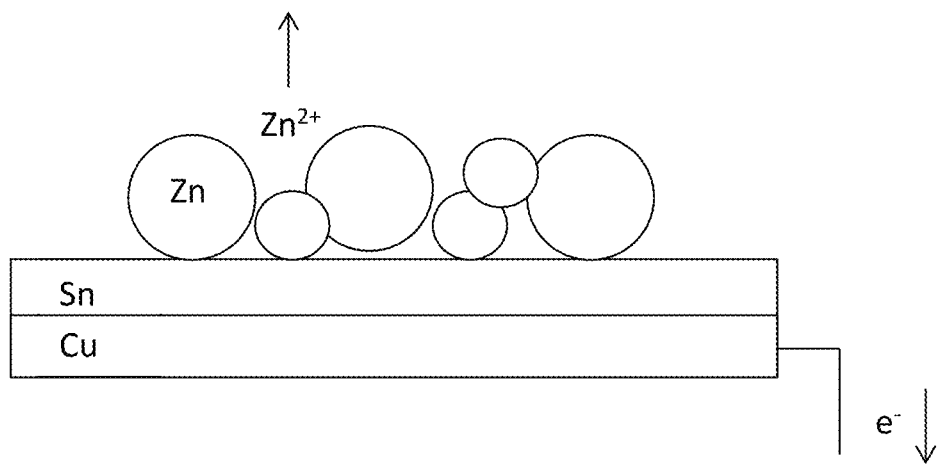
FIG. 5 illustrates a variation of the anode used in the embodiment of FIG. 4.

FIG. 5 illustrates in close-up a substrate of Cu overlaid with a substrate of Sn, which is used in the embodiment of FIG. 4. A layer of Zn powder (Zn-P) is pressed onto the Sn to complete the anode configuration.

Figure 6A:
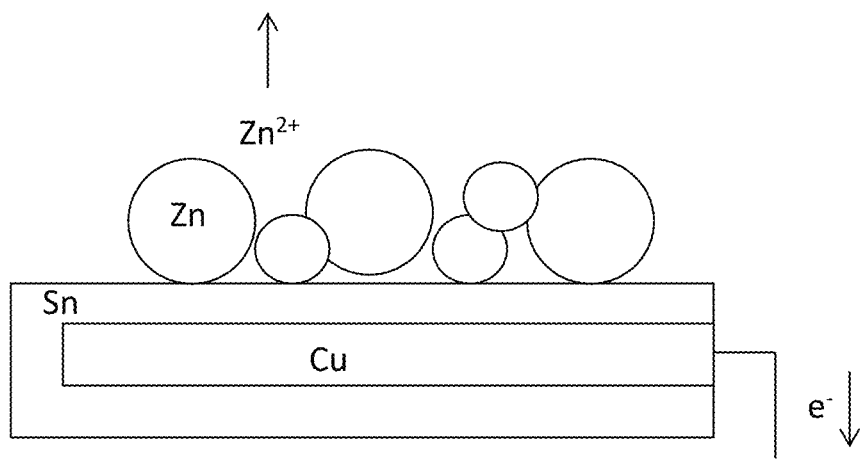
FIG. 6a illustrates another variation of the anode used in the embodiment of FIG. 4.

FIG. 6a shows an alternative, which is a substrate of Cu plated all around with a later of Sn, which can be used in place of the dual layer configuration of Sn and Cu in FIG. 4. One end of the Sn is filed to expose the Cu, in order to provide direct electrical contact to the Cu.

Figure 6B:
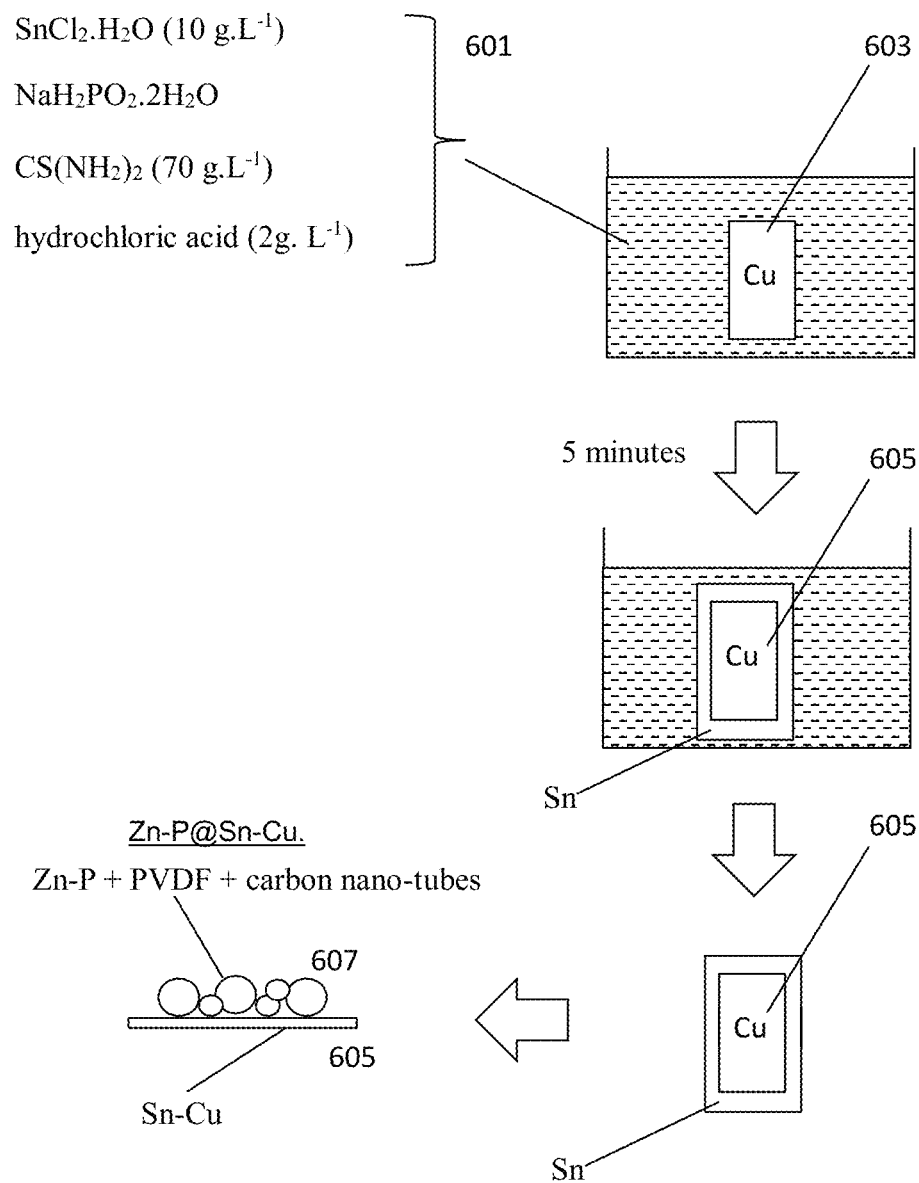
FIG. 6b illustrates one possible procedure for the manufacture of the anode used in the embodiment of FIG. 4.

FIG. 6b illustrates the process of plating a Cu substrate with Sn. A bath containing a solution 601 of the following is provided, solution of: $SnCl_2 \cdot H_2O$ (10 $g \cdot L^{-1}$), $NaH_2PO_2 \cdot 2H_2O$, $CS(NH_2)_2$ (70 $g \cdot L^{-1}$), and hydrochloric acid (2 $g \cdot L^{-1}$);

Subsequently, a piece of Cu 603 is immersed into the solution provide a layer of Sn on the piece of Cu. After 5 minutes, the Sn-coated piece of Cu 605 is removed from the solution, and washed with water.

Besides $SnCl_2$, other salts of Sn which may be used include $SnSO_4$, $(CH_3SO_3)_2Sn$ and so on.

A layer of powdered Zn 607 is then pressed upon the Sn surface to complete the anode Zn-P@Sn—Cu.

To make the Zn powder into an integral substrate later, a binder is blended into the Zn powder in a mass ratio 97:3. The binder can be PVDF, PTFE or similar polymers.

To improve conductivity of the Zn powder that is mixed with a binder, a conductive agent is also added into the Zn powder. The conductive agent is preferably a suspension of carbon nanotubes mixed in N-Methyl-2-pyrrolidone (NMP). Alternatively, the conductive agent is selected from a group comprising CNF, super P, Ketjen black, acetylene black.

Besides $MnO_2$, the cathode can be made of $V_2O_5$ or Prussian Analog.

Figure 7:
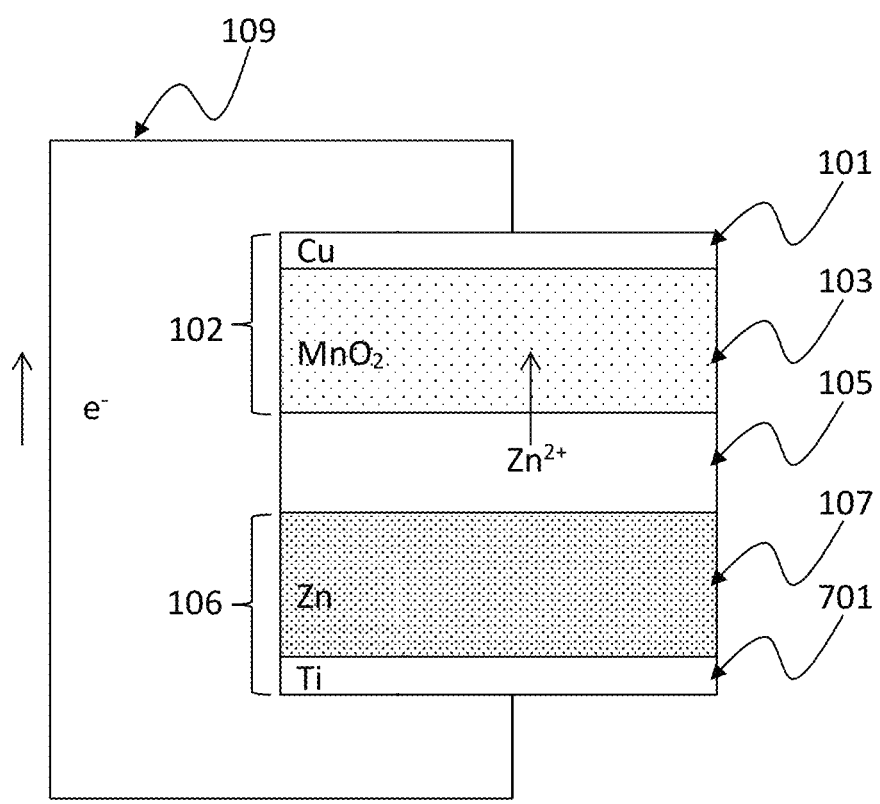
FIG. 7 illustrates an embodiment which is alternative to that of FIG. 4.

FIG. 7 shows a second embodiment, which is also a Zn battery. The anode 102 for the Zn battery is Zn powder 107 and the cathode 106 is $MnO_2$ powder 103. The $MnO_2$ powder 103 is placed to a Cu substrate 101 for a current collector. However, the Zn powder 107 is placed next to a titanium substrate 701 for a current collector, instead of a Cu substrate. This configuration is denoted Zn-P@Ti//$MnO_2$.

The second embodiment also mitigates the corrosion caused by placement of Zn next to Cu. However, use of Ti in the second embodiment has a further advantage of Ti being inert in aqueous electrolyte solutions.

Both the first embodiment and the second embodiment demonstrate effectiveness in avoiding galvanic corrosion, and may be incorporated into commercial batteries.

In particular, in the second embodiment in which the Cu substrate is replaced by Sn, a higher reserve of Zn and a better full cell storage performance can be achieved.

Experimental Data and Observation

Figures 8A, 8B:
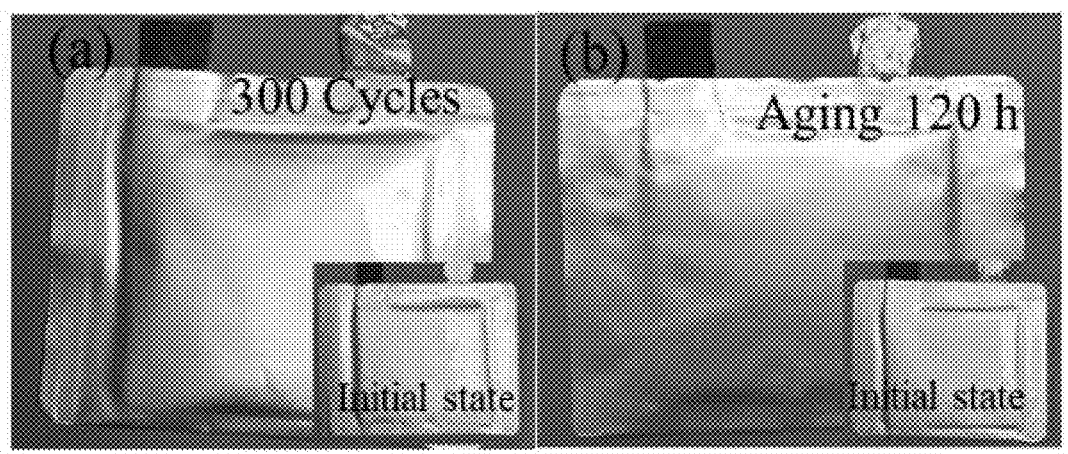
FIGS. 8a-8b show photographs of a prototype made according to the embodiment of FIG. 4.

The preliminary research of Zn//$MnO_2$ battery system to reveal the aging effects:

FIG. 8b on the right is a photograph, and shows the states of a Zn-P@Cu//$MnO_2$ battery, comparing the battery's initial state and the battery's state after 120 h of aging.

FIG. 8a on the left is a photograph, and shows the states of a Zn-P@Cu//$MnO_2$ battery, comparing the battery's initial state and the battery's state after 300 cycles.

The hydrogen production amount during Zn plating/striping process and aging process; (d) The cycling performance of the Zn-P@Cu//$MnO_2$ cell at the initial state and after aging for 120 h; the storage performance of the Zn-P@Sn—Cu//$MnO_2$ (e) and the corresponding voltage profile (f).

The following relates to the drawings in FIG. 9a to FIG. 9l, and to Battery level evaluation: the Zn amount test at the current of 0.1 $mA \, cm^{-2}$ at initial state (a) and 120 h of aging(b); (c) the EIS evolution for symmetric cell with aging time; (d) The hydrogen production during Zn plating/striping process and aging process; The digital photo of the cell of Zn-P@Sn—Cu//$MnO_2$ before and after aging (e), before and after cycles (f); The cycling performance of the Zn-P@Sn—Cu//$MnO_2$ cell for the initial state and aged for 120 h.; the storage performance of the Zn-P@Sn—Cu//$MnO_2$ (h) and the corresponding voltage profile (i);

Second embodiment: (j) The Zn amount of Zn-P@Ti at the initial state and aging for 120 h; (k) The EIS evolution for symmetric cell with aging time; (l) The cycling performance of the Zn-P@Ti//$MnO_2$ cell at the initial state and aging for 120 h.

Figure 9A:
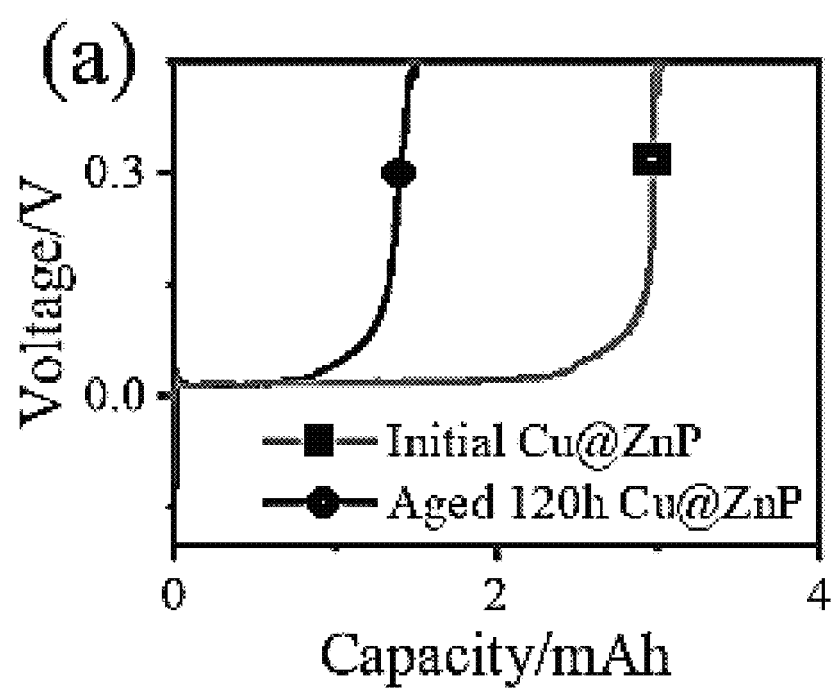
Figure 9B:
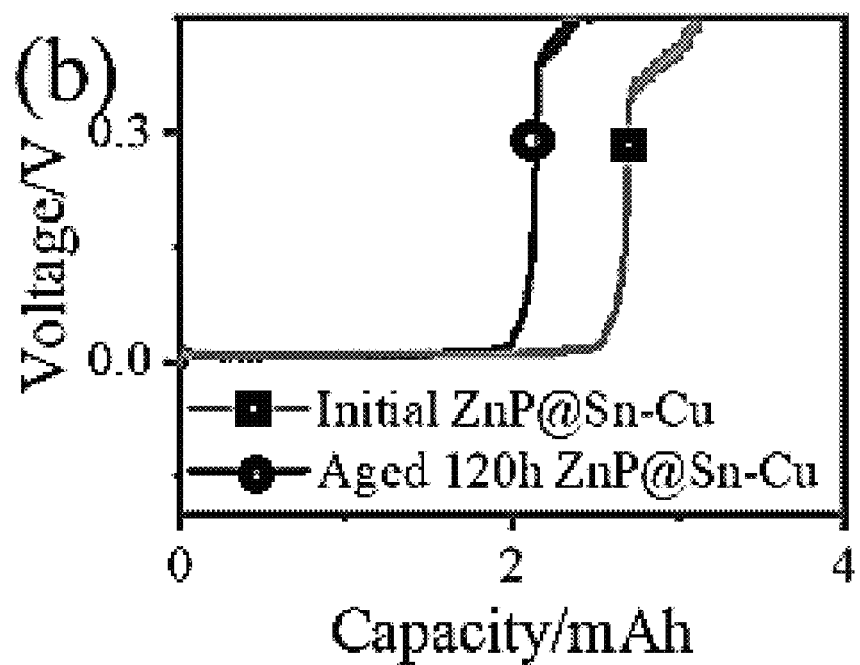
Figure 9C:
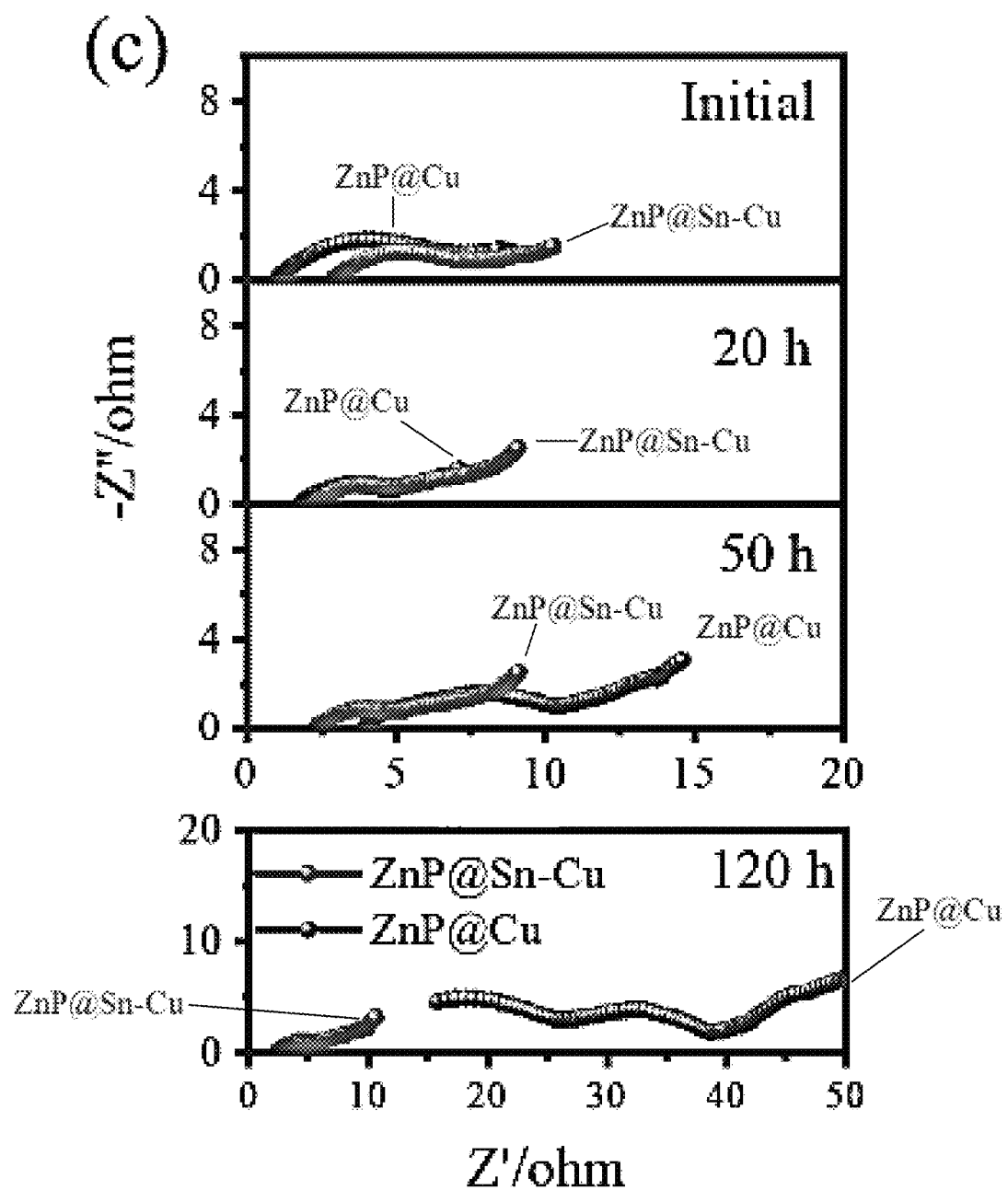

To inspect the consequences of the fast-galvanic corrosion, cell level evaluation was carried out. For the cell of at the initial state, the cell was tested right after the cell assembly with 1 h of aging to ensure the electrolyte infiltration; for the aged cell, the cell was aged for 120 h at the ambient temperature without further treatment before test. In the first trial, pure Zn-P and PVDF binder were used to fabricate the electrode (results not illustrated). Even a large amount 30 $mg \cdot cm^{-2}$ of Zn-P was applied, merely no active Zn-P could be utilized after only resting for 50 h. This phenomenon can be deciphered that the point to point conductive network formed by Zn-P is very vulnerable and cannot provide accurate information. Therefore, a small amount of conductive agent CNT with long-range conductivity is added to obtain a reliable result. FIG. 9a presents the voltage-capacity profile of the Zn-P@Cu electrode with Zn-P loading mass around 8 mg cm$^{-2}$ and a current density of 0.1 mA·cm$^{-2}$, the active amount was counted until the cut-off voltage to 0.45 V for comparison. Actually, even this low cut-off voltage is hard to reach when a corresponding full cell reaches the cut-off potential[20]. The aged electrode first increases dramatically to reach the final voltage until the capacity of 1.5 mAh is attained, while the initial electrode denotes a later voltage increase and a higher capacity of 3.02 mAh. With the same loading mass and small current density, the available Zn amount of aged electrode is only half of this number for the initial electrode, directly reveals the huge capacity loss due to Zn dissolution with the presence of galvanic corrosion. In contrast, the Zn-P@Cu—Sn electrode exhibited a much higher Zn reserve after aging for 120 h: 2.36 mAh after aged compare to the initial amount of 3.07 mAh. The loss of the Zn amount is possibly come from the intrinsic instability of Zn-P in aqueous solution. Symmetric cell is ideal to capture the resistance evolution by exclude the disturb from another electrode.

Figure 9D:
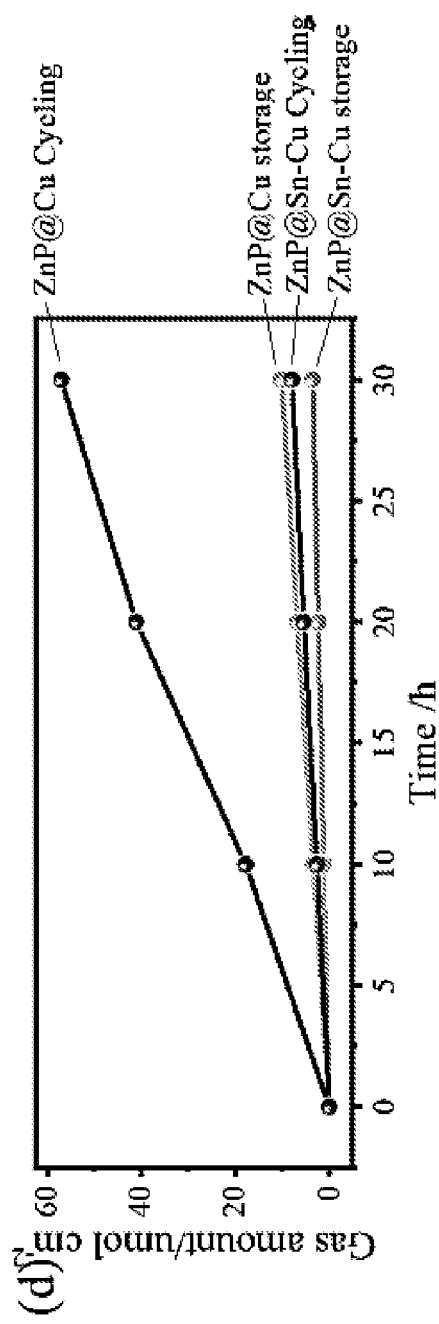
Figure 9E:
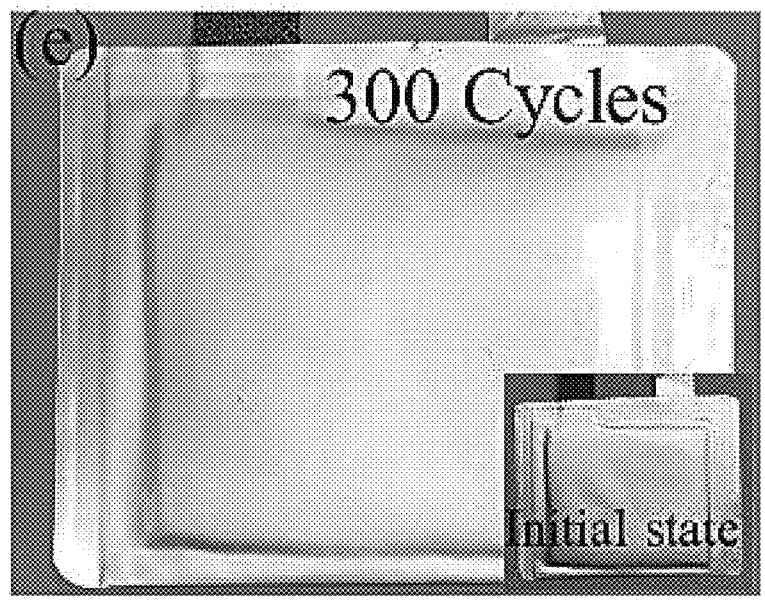

The intercept refers to equivalent series resistance ($R_{se}$), the one semi circuit represents the charge transfer resistance ($R_{ct}$). The Zn-P@Sn—Cu cell demonstrated a slightly higher $R_{se}$ in the initial state than Zn-P@Cu which can be assigned to the lower conductivity for Sn compared with Cu, and the initial $R_{ct}$ is similar in initial state. The $R_{ct}$ of both cells decreased to around 4Ω after 20 h of aging, this may be attributed to the infiltration of the electrolyte facilitating the charge transfer process. After aging for 50 h, the EIS spectra of Zn-P@Sn—Cu almost maintained similar $R_{ct}$ and $R_{se}$ with the cell after 20 h aging, while the $R_{ct}$ and $R_{se}$ of Zn-P@Cu cell increased to 4 and 6Ω, respectively, which is highly possible ascribed to the deteriorated contact loss and solvent decomposition. Further aged for 120 h, the Zn-P@Cu—Sn still kept a similar level of $R_{ct}$ and $R_{se}$. In contrast, the EIS spectra of Zn-P@Cu experienced a dramatical change with much increased $R_{ct}$ and $R_{se}$. This is attributed to the continuous hydrogen evolution and the Zn-P dissolution lead to contact loss and greatly affect the battery. The further hydrogen amount was measured during cell aging and cycling, as shown in FIG. 9d. The hydrogen generation is much smaller of the Zn-P@Sn—Cu both in storage process and cycling process than that of Zn-P@Cu electrode with accumulated 7.9 μmol·cm$^{-2}$ after 30 h cycling and 3.5 μmol·cm$^{-2}$ after 30 h storage. This demonstrated the Sn—Cu is feasible to work as current collector to suppress hydrogen generation.

Figure 9F:
Figure 9G:
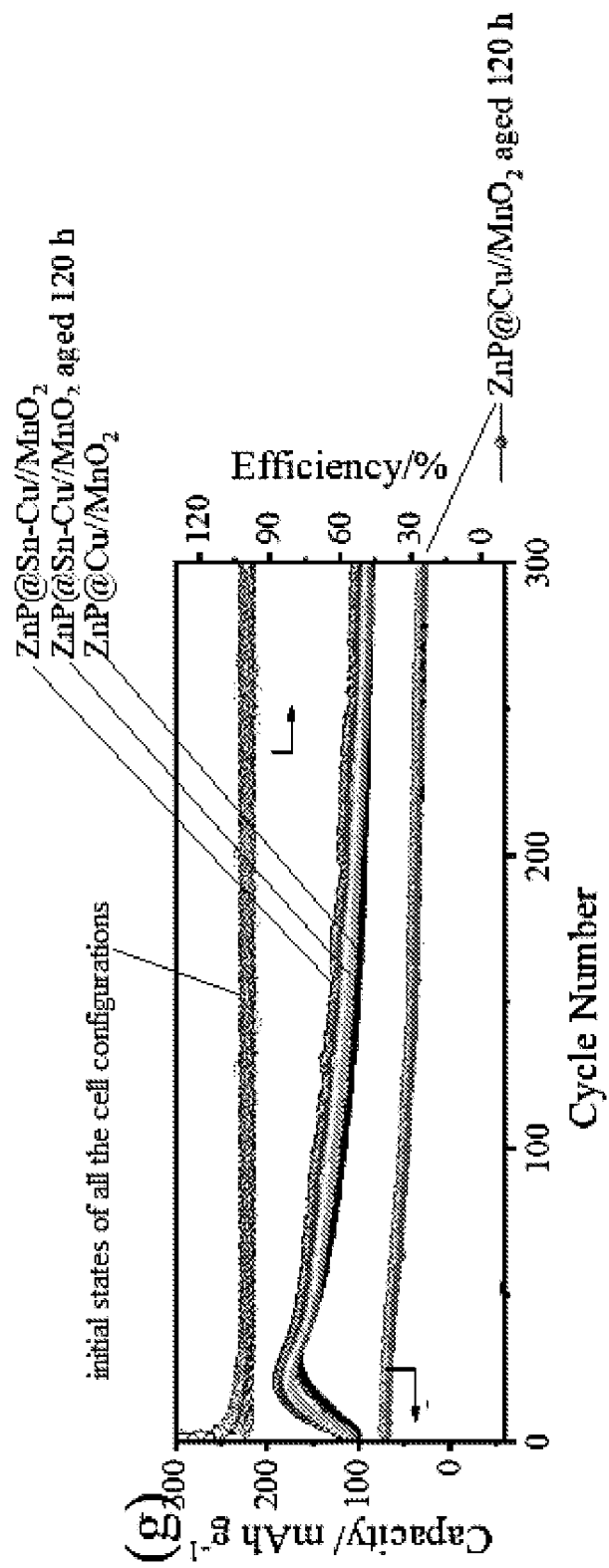
Figure 9H:
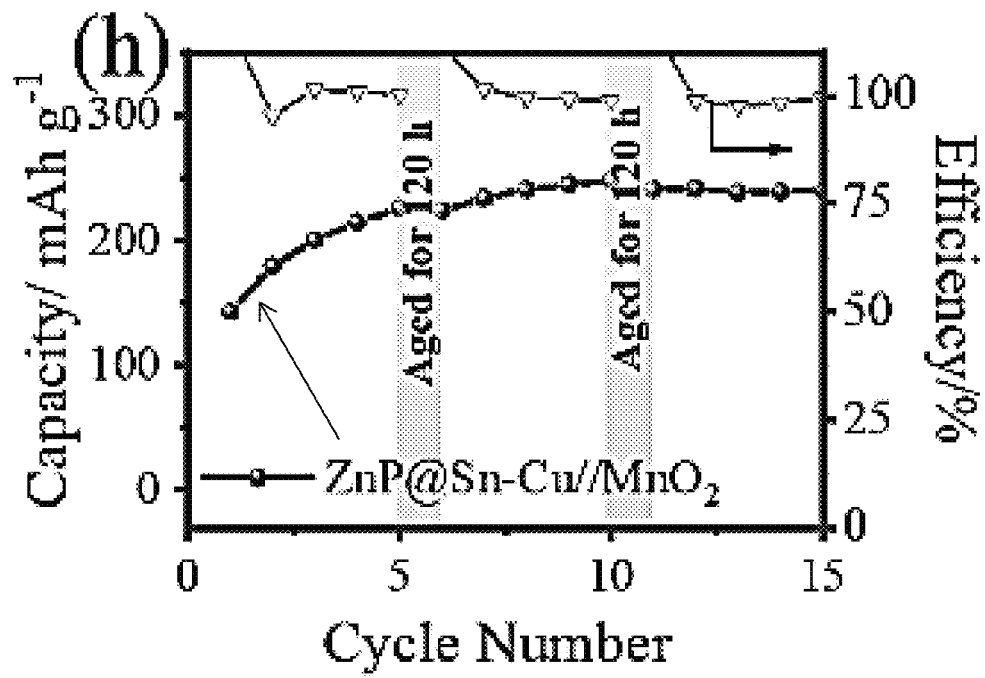
Figure 9I:
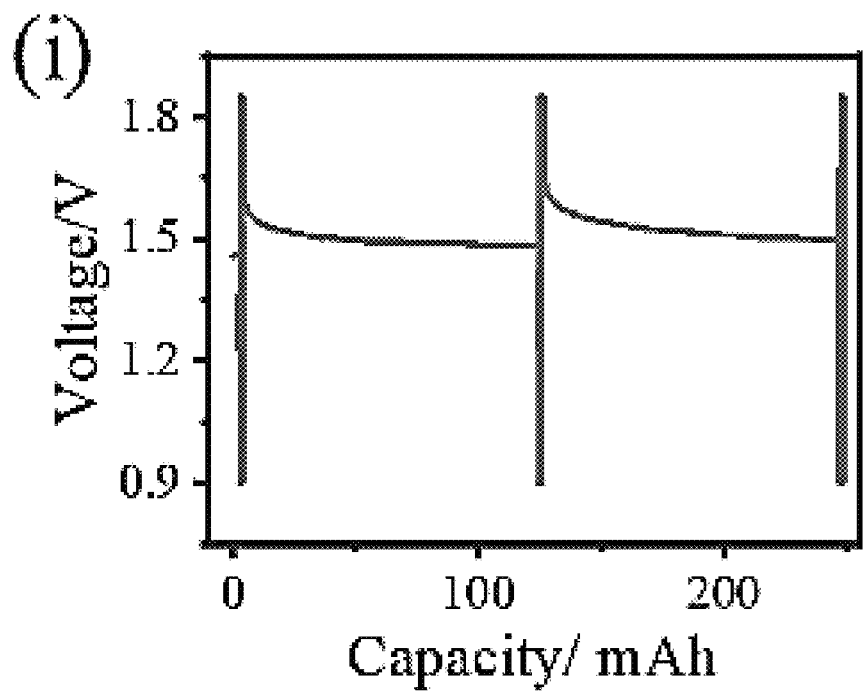

Further Zn-P@Sn—Cu//MnO$_2$ pouch cell supported that the hydrogen evolution has been suppressed by employing Sn coating and the cell showed limited shape change after aging (FIG. 9e) and cycles (FIG. 9f). The thickness of the pouch cells increased by 9% and 7% after aging and cycles, respectively, indicating a controllable cell swelling compare with the cell employ Cu as current collector. The Zn-P@Cu//MnO$_2$ and Zn-P@Sn—Cu//MnO$_2$ manifested similar cycling performance at the initial state test. The cycling performance of Zn-P@Sn—Cu//MnO$_2$ after a 120 h storage was only slightly worse than the pristine cell (FIG. 9g), this is much improved when comparing with the capacity exhibited by Zn-P@Cu//MnO$_2$, suggest that the suppression of galvanic corrosion can improve the storage performance. The similar cycling behaviors between the Zn-P@Cu//MnO$_2$ and Zn-P@Sn—Cu//MnO$_2$ cell in initial state indicates that the galvanic corrosion was whitewashed by constant cycling and storage process is necessary to distinguish the difference. Further information can be obtained from the GCD curves of the cells (not shown), and the voltage of Zn-P@Cu//MnO$_2$ was vertically dropped between 1.2 to 0.9 V without any capacity contribution from the second platform of MnO$_2$, demonstrating no sufficient Zn supply in the later stage of discharge, suggesting the deterioration of cycling after aging is attribute to the Zn loss back to the galvanic corrosion. The GCD curve of Zn-P@Sn—Cu before and after aging then showed a similar shape with slightly larger polarization (not shown), then validated the successful suppression of galvanic corrosion and higher Zn reservation accordingly. The EIS spectra of full cell Zn-P@Sn—Cu//MnO$_2$ with different aging time witnessed limited change, the $R_{ct}$ of Zn-P@Cu//MnO$_2$ increased for several orders of magnitude (not illustrated), demonstrated the deterioration of galvanic corrosion. The calendar life of Zn-P@Sn—Cu//MnO$_2$ is also much enhanced (FIG. 9h) compare with the one with Cu as current collector. The initial 120 h rest has not caused any capacity decay with continuously capacity curve before and after aging. Similar phenomenon was witnessed in the following storage process, indicating the Zn amount is enough to support the cycling. The decreased capacity might be caused by the intrinsic instability of Zn-P in aqueous surrounding. The results indicated that the galvanic corrosion is highly associated with the cell storage performance and the successful suppression of galvanic corrosion can deliver a better cell performance and much reliable cell configuration with less hydrogen evolution.

Figure 9J:
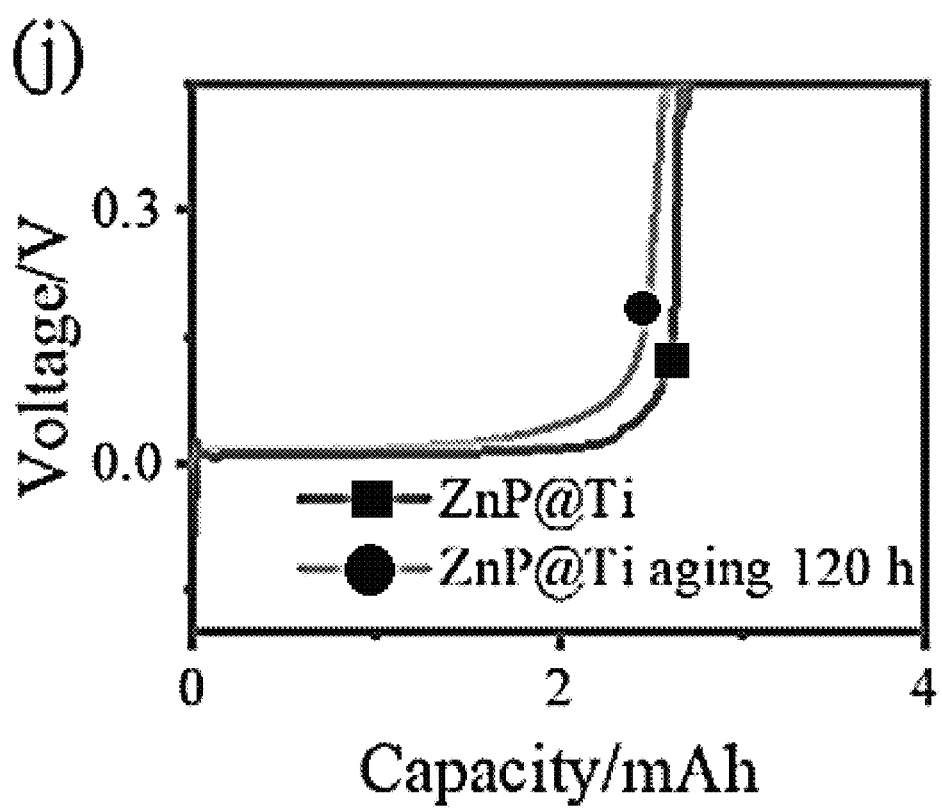
Figure 9K:
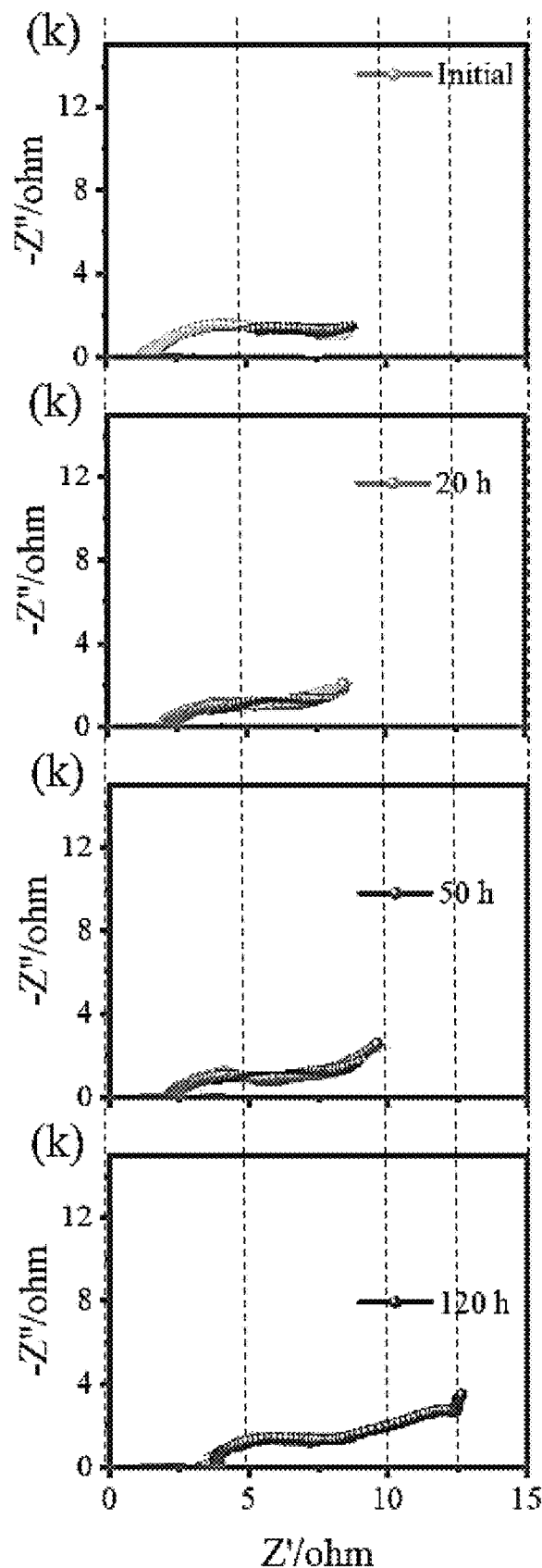
Figure 9I:
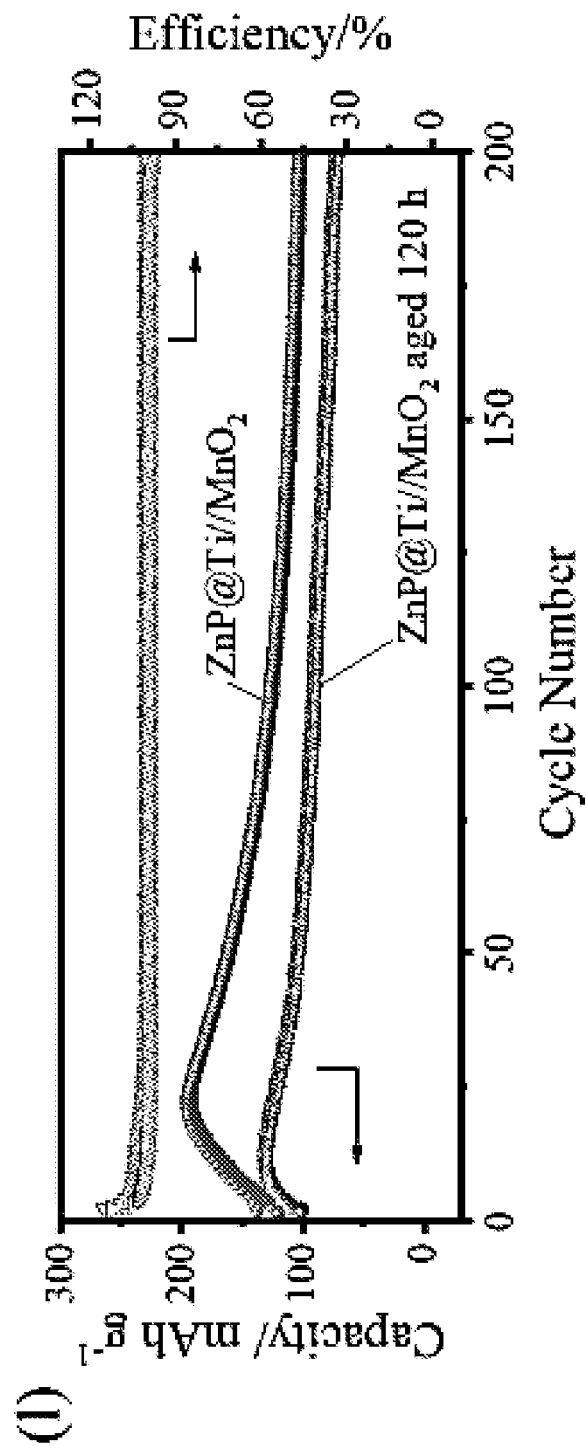

Cell with Ti as current collector was also briefly investigated here. The capacity retention after a 120 h of aging was also quite high with Ti as current collector which was 2.59 out of 2.67 mAh for the initial electrode, which proved the avoiding of the galvanic corrosion (FIG. 9j). As shown in FIG. 9k, the $R_{se}$ of the symmetric cell with Zn-P@Ti witnessed a slight increase and $R_{ct}$ of the Zn-P@Ti maintained at a similar level with the increase of aging time which demonstrated a stable state for the Zn-P@Ti electrode. With a full cell of MnO$_2$, the same mass ratio of anode and cathode of 10:7 was also applied here. The initial capacity of the aged cell was similar to the cell without aging, a lower capacity was presented in the later cycling but still achieved a high capacity of 72 mAh·g$^{-1}$ (FIG. 9l). The GCD curves of the initial cycles of aged Zn-P@Ti//MnO$_2$ (not illustrated) indicated slight increase of polarization and limited capacity loss which indicated a higher consistency with the fresh Zn-P@Ti//MnO$_2$ cell. From the performance evaluated, Ti as a current collector has demonstrated a high anti-galvanic corrosion property.

The invention claimed is:
1. A battery comprising:
an anode, which comprises:
a zinc substrate;
a copper substrate; and
a tin substrate placed between the zinc substrate and the copper substrate; and
a cathode comprising MnO$_2$, V$_2$O$_5$, or Prussian Analog.
2. The battery as claimed in claim 1, wherein the tin substrate is applied by electroplating the copper substrate in an electrolyte solution selected from the group consisting of SnSO$_4$, SnCl$_2$, and (CH$_3$SO$_3$)$_2$Sn.
3. The battery as claimed in claim 1, wherein
the zinc substrate is a layer of zinc powders; or
a layer of Zn electrodeposited onto the tin substrate.
4. The battery as claimed in claim 3, wherein the zinc powders are applied onto the tin substrate as a coating slurry;
the coating slurry comprises:
zinc powders and a binder in a mass ratio of 97:3.

5. The battery as claimed in claim 4, wherein the binder is polyvinylidene difluoride (PVDF) or polytetrafluoroethylene (PTFE).

6. The battery electrode as claimed in claim 4, wherein the coating slurry further comprises:
   a conductive agent;
   wherein, the conductive agent being a suspension of carbon nanotubes in N-Methyl-2-pyrrolidone (NMP); or
   the conductive agent is selected from the group consisting of cellulose nanofiber (CNF), super P, Ketjen black, and acetylene black.

7. A battery comprising:
   an anode, which comprises:
      a zinc substrate; and
      a titanium substrate for a current collector; and
   a cathode, which comprises any one of $V_2O_5$ or Prussian Analog.

8. The battery as claimed in claim 7, wherein the zinc substrate is a layer of zinc powders; or a layer of Zn electrodeposited onto the titanium.

9. The battery as claimed in claim 8, wherein the zinc powders are applied onto the titanium layer as a coating slurry; the coating slurry comprises:
   zinc powders and a binder in a mass ratio of 97:3.

10. The battery as claimed in claim 9, wherein the binder is selected from the group consisting of PVDF and PTFE.

11. The battery as claimed in claim 9, wherein the coating slurry further comprises
   a conductive agent; and
   wherein, the conductive agent is a suspension of carbon nanotubes in N-Methyl-2-pyrrolidone (NMP); or
   the conductive agent is selected from the group consisting of CNF, super P, Ketjen black, and acetylene black.

12. A battery electrode as claimed in claim 1, comprising:
   a copper current collector coated with tin; the copper current collector coated with tin provided by a method comprising the steps of:
   providing a solution of: $SnCl_2 \cdot H_2O$ (10 g·L$^{-1}$), $NaH_2PO_2 \cdot 2H_2O$, $CS(NH_2)_2$ (70 g·L$^{-1}$), and hydrochloric acid (2 g·L$^{-1}$);
   immersing a piece of copper into the solution for 5 minutes to provide a layer of tin on the piece of copper;
   lifting the tin coated piece of copper from the solution; and
   washing the tin coated piece of copper with water.

\* \* \* \* \*

UNITED STATES PATENT AND TRADEMARK OFFICE
CERTIFICATE OF CORRECTION

PATENT NO. : 11,955,627 B2
APPLICATION NO. : 17/580192
DATED : April 9, 2024
INVENTOR(S) : Chunyi Zhi et al.

Page 1 of 1

It is certified that error appears in the above-identified patent and that said Letters Patent is hereby corrected as shown below:

In the Claims

Column 7, Line 4, cancel the text beginning with "6. The battery as claimed in claim 4" to and ending "and acetylene black." in Column 7, Line 12, and insert the following claim:
--6. The battery as claimed in claim 4, wherein the
coating slurry further comprises:
a conductive agent;
wherein, the conductive agent being a suspension of
carbon nanotubes in N-Methyl-2-pyrrolidone (NMP);
or
the conductive agent is selected from the group consisting
of cellulose nanofiber (CNF), super P, Ketjen black,
and acetylene black.

Signed and Sealed this
Second Day of July, 2024

Katherine Kelly Vidal
*Director of the United States Patent and Trademark Office*